(12) United States Patent
Evenburg

(10) Patent No.: US 12,135,579 B2
(45) Date of Patent: Nov. 5, 2024

(54) METHOD OF OPERATING A DEVICE, DEVICE AND SYSTEM

(71) Applicant: Beckhoff Automation GmbH, Verl (DE)

(72) Inventor: Birger Evenburg, Selmsdorf (DE)

(73) Assignee: Beckhoff Automation GmbH, Verl (DE)

( * ) Notice: Subject to any disclaimer, the term of this patent is extended or adjusted under 35 U.S.C. 154(b) by 10 days.

(21) Appl. No.: 17/705,824

(22) Filed: Mar. 28, 2022

(65) Prior Publication Data

US 2022/0221896 A1 Jul. 14, 2022

Related U.S. Application Data

(63) Continuation of application No. PCT/EP2020/082355, filed on Nov. 17, 2020.

(30) Foreign Application Priority Data

Nov. 25, 2019 (DE) .................... 10 2019 131 848.3

(51) Int. Cl.
*G06F 1/12* (2006.01)
*G06F 1/08* (2006.01)
*H04L 7/00* (2006.01)

(52) U.S. Cl.
CPC .................. *G06F 1/12* (2013.01); *G06F 1/08* (2013.01); *H04L 7/0008* (2013.01)

(58) Field of Classification Search
CPC ....................................................... G06F 1/12
USPC ........................................................ 327/320
See application file for complete search history.

(56) References Cited

U.S. PATENT DOCUMENTS

| 4,583,865 | A | * | 4/1986 | Kirk ...................... G04G 7/00 368/118 |
| 2014/0198859 | A1 | | 7/2014 | Farrokhi |
| 2014/0309956 | A1 | | 10/2014 | Mondot |
| 2017/0356937 | A1 | | 12/2017 | Vaculik et al. |

FOREIGN PATENT DOCUMENTS

| DE | 10128258 A1 | 12/2002 |
| WO | 02073850 A2 | 9/2002 |

OTHER PUBLICATIONS

Frank et al, "Clock Synchronization of Distributed Computers in Building Automation Networks Using an AC Power Supply", IEEE, 2008 (Year: 2008).*
"EtherCAT—the Ethernet Fieldbus," EtherCAT Technology Group, Nov. 2012, 21 pages.
International Search Report and Written Opinion dated Feb. 23, 2021 in connection with PCT/EP2020//082355, 19 pages including English translation.
International Preliminary Report on Patentability dated Mar. 7, 2022 in connection with International Patent Application No. PCT/EP2020/082355, 13 pages including English translation.

(Continued)

*Primary Examiner* — Tomi Skibinski
(74) *Attorney, Agent, or Firm* — Dorsey & Whitney LLP

(57) ABSTRACT

In a method for operating a device comprising an internal clock generator and an internal clock and being connected to a network, the internal clock is incremented by the internal clock generator. Moreover, the internal clock is synchronized with a network frequency of the network.

13 Claims, 3 Drawing Sheets

(56) References Cited

OTHER PUBLICATIONS

Office Action dated Nov. 25, 2019 in connection with German patent application No. 102019131843.3, 13 pages including English translation.
Frank, Heinz, et al., Frank, Heinz et al. "Clock Synchronization of Distributed Computers in Building Automation Networks Using an AC Power Supply," IEEE, Nov. 10, 2008, pp. 2730-2735.
Rowe, Anthony, et al., Rowe, Anthony et al. "Low-power Clock Synchronization using Electromagnetic Energy Radiating from AC Power Lines," ACM, Nov. 4, 2009, pp. 211-224.
"Real Time Clock Timebase with Automatic 50/60 Hertz Synchronization" Motorola Technical Developments, Apr. 1984, pp. 20-21.
Office Action dated Apr. 8, 2024 in connection with European patent application No. 20 810 883.7, 12 pages including English translation.

\* cited by examiner

METHOD OF OPERATING A DEVICE, DEVICE AND SYSTEM

CROSS-REFERENCE TO RELATED APPLICATIONS

The present patent application is a continuation of International Patent Application PCT/EP2020/082355, filed 17 Nov. 2020, entitled METHOD FOR OPERATING A DEVICE, DEVICE AND SYSTEM, which claims the priority of German patent application DE 10 2019 131 848.3, filed 25 Nov. 2019, entitled VERFAHREN ZUM BETREIBEN EINES GERÄTS, GERÄT UND SYSTEM, each of which is incorporated by reference herein, in the entirety and for all purposes.

FIELD

The present invention relates to a method of operating a device, to a device, and to a system comprising at least two devices.

BACKGROUND

It is known from the prior art to equip devices with internal clocks which are incremented by an internal clock generator. However, the frequencies of such internal clocks are known to be subject to manufacturing tolerances and may also be dependent on external conditions such as temperature. As a result, the internal clocks of two devices may run at different speeds.

Various ways of synchronizing the internal clocks of several devices with one another are known from the prior art. Such synchronization may e.g. take place via a time source connected to the devices via a data network or via time information contained in GPS signals.

Also known from the prior art are synchronous clocks which derive their time base from the network frequency of a power-supply network.

SUMMARY

The present invention provides a method of operating a device, a device, and a system comprising at least two devices.

According to one aspect, in a method of operating a device having an internal clock and an internal clock generator and being connected to a network, the internal clock is incremented by the internal clock generator. In doing so, the internal clock is synchronized to a network frequency of the network.

According to one aspect, a device comprises an internal clock, which may be incremented by an internal clock generator, and a network connection for connection to a network. Thereby, the device is adapted to synchronize the internal clock with a network frequency of the network.

According to one aspect, a system comprises a first device and a second device, each embodied in the manner described above. Thereby, the first device and the second device are connected to a shared network.

EXAMPLES

In a method of operating a device having an internal clock and an internal clock generator and being connected to a network, the internal clock is incremented by the internal clock generator. In doing so, the internal clock is synchronized to a network frequency of the network. The network may e.g. be a power-supply network. Advantageously, this method ensures that the internal clock of the device runs synchronously with the network frequency of the network. Advantageously, this ensures that the internal clock of this device runs at the same speed as the internal clocks of other devices that are also synchronized to the network frequency of the network. Thus, the internal clocks of such devices run synchronously. Since the internal clock of the device is incremented by the internal clock generator, the internal clock of the device may advantageously have a high temporal resolution, in particular a temporal resolution that is higher than the network frequency of the network.

In an embodiment of the method, the internal clock is periodically synchronized with the network frequency of the network. Advantageously, this ensures that the time progress of the internal clock of the device is regularly adjusted to the time base specified by the network frequency of the network.

In an embodiment of the method, the network is a power-supply network. Zero crossings of a voltage of the network are detected. The internal clock is thereby synchronized with the network frequency of the network at each zero crossing of the voltage. Advantageously, zero crossings of the voltage of the network may be detected with high accuracy. This advantageously allows for a particularly precise synchronization of the internal clock with the network frequency of the network.

In an embodiment of the method, the internal clock generator has a frequency that is higher than the network frequency of the network. For example, the frequency of the internal clock may be several orders of magnitude higher than the network frequency of the network. Advantageously, the internal clock of the device may thereby have a temporal resolution that is finer than one period of the network frequency of the network.

In an embodiment of the method, the method comprises steps for detecting a measuring value and for providing the measuring value with a time stamp of the internal clock. The time stamp of the internal clock may indicate the time at which the measuring value was detected. By synchronizing the internal clock with the network frequency of the network in accordance with the method, it is advantageously achieved that the time stamp refers to a time system synchronized with the network frequency of the network.

In an embodiment of the method, it comprises a further step for sending out the measuring value provided with the time stamp via a data network. Advantageously, this makes it possible to further process the time-stamped measuring value at another location, e.g. in another network subscriber of the data network.

In an embodiment of the method, this comprises a step for outputting a signal at a specified time value of the internal clock. In this context, it is advantageous that the internal clock is synchronized with the network frequency of the network in order to ensure that the time values of different network subscribers of the data network are synchronized.

A device comprises an internal clock, which may be incremented by an internal clock generator, and a network connection for connection to a network. Thereby, the device is adapted to synchronize the internal clock with a network frequency of the network. Advantageously, the internal clock of this device thereby runs synchronously with the network frequency of the network. This ensures that the internal clock of this device runs at the same speed as the internal clocks of other devices that also synchronize their internal clocks with the network frequency of the network. Advantageously, since the internal clock of this device is incremented by the internal clock generator, the internal clock of the device may have a temporal resolution finer than one period of the network frequency of the network.

In an embodiment of the device, the network connection may be connected to a power-supply network. In this case, the device is embodied to detect zero crossings of a voltage of the network. Advantageously, zero crossings of the voltage of the network may be detected with high accuracy, which enables a particularly precise synchronization of the internal clock with the network frequency of the network.

In an embodiment of the device, the internal clock has a frequency that is higher than the network frequency of the network. For example, the frequency of the internal clock generator may be several orders of magnitude higher than the network frequency of the network. Advantageously, the internal clock of the device may thereby have a temporal resolution that is finer than one period of the network frequency of the network.

In an embodiment of the device, it is embodied to detect a measuring value and to provide the detected measuring value with a time stamp of the internal clock. The time stamp may indicate the value of the internal clock at the time when the measuring value was detected. Since the internal clock of the device may be synchronized with the network frequency of the network, the time stamp is then available in a time system that is synchronous with the network frequency of the network.

In an embodiment of the device, it is embodied to send the measuring value provided with the time stamp via a data network. This advantageously allows for the measuring value provided with the time stamp to be further processed at another location, e.g. in another network subscriber of the data network.

In an embodiment of the device, it is embodied to output a signal at a specified time value of the internal clock. It is advantageous that the internal clock of the device may be synchronized with the network frequency of the network in order to ensure synchronization of the time values of different network subscribers of the data network.

In an embodiment of the device, it is embodied as an EtherCAT network subscriber. Advantageously, the internal clock of this EtherCAT network subscriber may be synchronized with the network frequency of the network.

A system comprises a first device and a second device, each embodied in the manner described above. Thereby, the first device and the second device are connected to a shared network. As a result, the network frequency of the shared network is available to both devices to synchronize the respective internal clocks of the devices. If the first device synchronizes its internal clock with the network frequency of the network and the second device also synchronizes its internal clock with the same network frequency of the shared network, then the internal clocks of both devices are advantageously synchronized with each other.

BRIEF DESCRIPTION OF THE DRAWINGS

The present invention is described in more detail below with reference to figures, which show.

DETAILED DESCRIPTION

Figure 1:
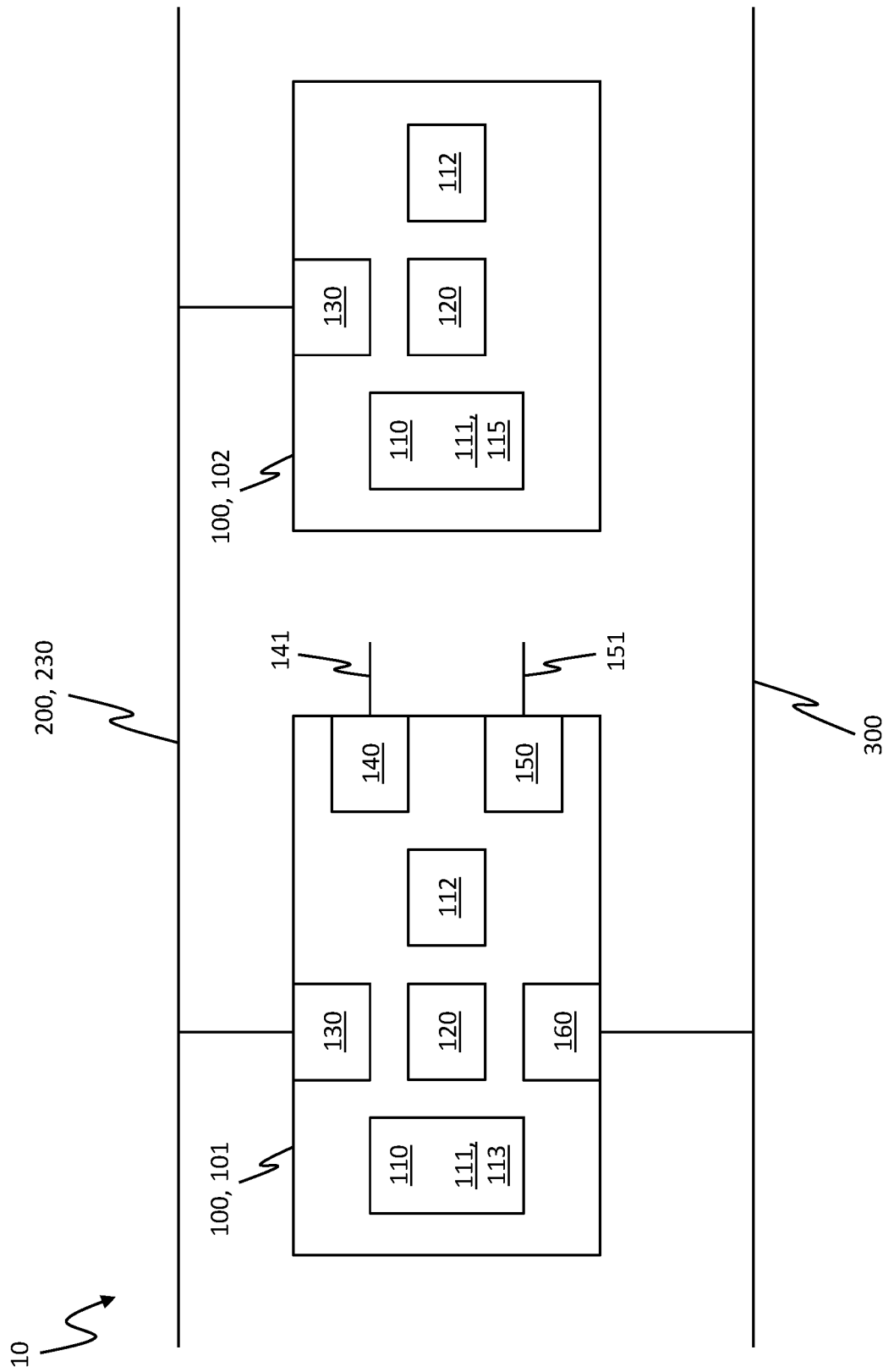
FIG. 1 a schematic diagram of a system having two devices connected to a network.

FIG. 1 shows a schematic diagram of a system 10. The system 10 comprises a plurality of devices 100. In the example shown in FIG. 1, the system 10 comprises a first device 100, 101 and a second device 100, 102. However, the system 10 may comprise more than two devices 100.

The devices 100 of the system 10 have similarities, which are described below. In addition, differences may also exist between the individual devices 100 of the system 10. In the example of the system 10 shown in FIG. 1, there are similarities and differences between the first device 100, 101 and the second device 100, 102.

The devices 100 of the system 10 each comprise an internal clock generator 110. The internal clock generator 110 provides a clock signal having a frequency 111. Here, the frequency 111 of the clock signal provided by the internal clock generator 110 of the first device 100, 101 may differ from the frequency 111 of the clock signal provided by the internal clock generator 110 of the second device 100, 102 such that the clock signal of the internal clock generator 110 of the first device 100, 101 has a first frequency 111, 113 and the clock signal of the internal clock generator 110 of the second device 100, 102 has a second frequency 111, 115. The frequencies 111 of the internal clocks 110 of the devices 100 may e.g. be a few MHz or a few GHz.

Each device 100 of the system 10 comprises an internal clock 120. The internal clock 120 may e.g. be embodied as a data register. A numerical value stored in this data register represents a time value of the internal clock 120 of the device 100. The time value of the internal clock 120 may e.g. be represented with a resolution of 1 μs or 1 ns.

Each device 100 is configured to increment its internal clock 120 by the internal clock generator 110. For this purpose, the respective device 100 may e.g. comprise an adjustable parameter 112 that specifies the ratio to the frequency 111 of the internal clock generator 110 by which the internal clock 120 is incremented.

Each device 100 of the system 10 comprises a network connection 130. The network connection 130 is intended to connect the respective device 100 to a network 200. Thereby, all devices 100 of the system 10 are connected to the same network 200.

The network 200 provides a network frequency 230.

For example, the network 200 may be a power-supply network. In this case, the network 200 provides a voltage 210, the voltage value of which changes periodically with the network frequency 230. In the example described with reference to the figures, the network 200 is embodied as a power-supply network.

However, the network 200 may be a different network that provides the network frequency 230. For example, the network 200 may be embodied by a simple line that the network frequency 230 is coupled into.

If the network 200 is a power-supply network, the network 200 may serve to supply power to the devices 100. However, this is not absolutely necessary. The devices 100 may also cover their power requirements from other power sources.

The frequencies 111 of the internal clock generators 110 of the individual devices 100 of the system 10 may deviate from their nominal values due to component tolerances. In addition, the frequencies 111 of the internal clock generators 110 of the devices 100 of the system 10 may be subject to variations over time, e.g. due to temperature changes. As a result, the internal clocks 120 of the devices 100 of the system 10 may run at different speeds from each other if the internal clocks 120 are not synchronized. For example, if the internal clock 120 of the first device 100, 101 and the internal clock 120 of the second device 100, 102 run at different speeds, the time of the internal clock 120 of the first device 100, 101 and the time of the internal clock 120 of the second device 100, 102 will increasingly drift apart over time.

In order to prevent this, each device 100 of the system 10 is embodied to synchronize its internal clock 120 with the network frequency 230 of the shared network 200. This also synchronizes the internal clocks 120 of the individual devices 100 to each other.

The line frequency 230 is typically several orders of magnitude less than the frequency 111 of the internal clock generator 110 of the devices 100. For example, the line frequency 230 may be 50 Hz or 60 Hz.

Figure 2:
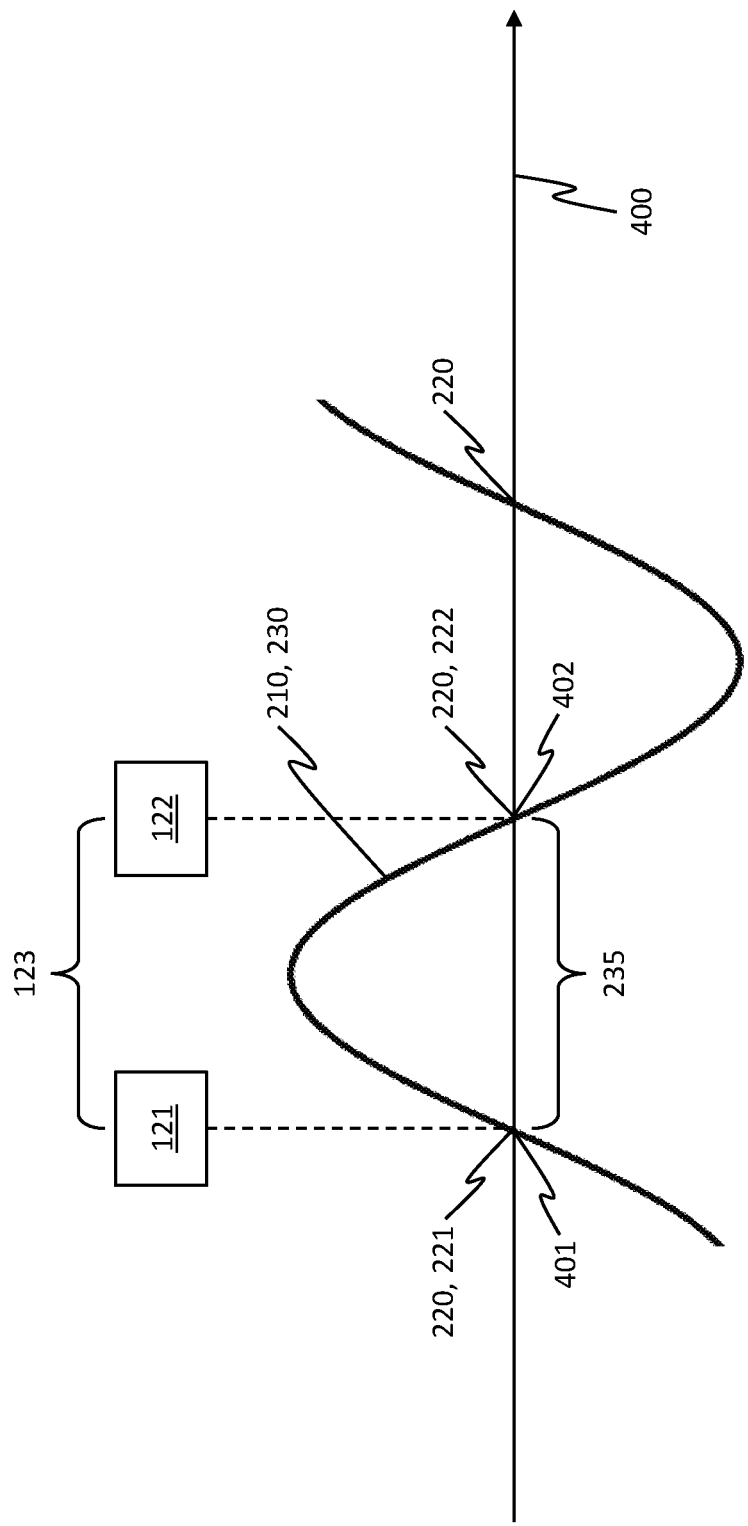
FIG. 2 a time progress of a voltage of the network.

FIG. 2 shows a schematic diagram of the voltage 210 of the network 200 as a function of time 400. The voltage 210 has zero crossings 220 that occur periodically over the course of time 400. At a first point in time 401, a first zero crossing 220, 221 of the voltage 210 occurs. At a second point in time 402, a second zero crossing 220, 222 of the voltage 210 occurs. Between the first zero-crossing 220, 221 and the second zero-crossing 220, 222 there is a half-cycle of the voltage 210, so that the time interval between the first time 401 and the second time 402 corresponds to a half-cycle duration 235 calculated as half of the reciprocal of the network frequency 230 of the network 200. For example, if the network frequency 230 is 50 Hz, the half-cycle duration 235 is 10 ms.

In order to synchronize the respective internal clock 120 with the network frequency 230 of the network 200, each device 100 may be embodied to detect zero crossings 220 of the voltage 210 of the network 200. In doing so, a present value of the internal clock 120 of the respective device 100 is determined at each zero crossing. This is schematically shown in FIG. 2. At the first zero crossing 220, 221 of the voltage 210 at the first point in time 401, the internal clock 120 has a first clock value 121. At the second zero crossing 220, 222 at the second point in time 402, the internal clock 120 exhibits a second clock value 122. Since the internal clock 120 has been incremented between the first point in time 401 and the second point in time 402, the second clock value 122 is larger than the first clock value 121. The difference between the first clock value 121 and the second clock value 122 may be referred to as the clock advance 123.

If the network frequency 230 of the network 200 is known to the respective device 100, the synchronization of the internal clock 120 with the network frequency 230 of the network 200 may be carried out in the following manner: the time period elapsed between the first point in time 401 and the second point in time 402 corresponds to the half-cycle duration 235 of the network frequency 230 of the network 200, which is also known to the respective device 100. Thus, by comparing the clock advance 123 with the half-cycle duration 235, it may be determined whether the internal clock 120 of the respective device 100 is running too fast or too slow. If the clock advance 123 is larger than the half-cycle duration 235, the internal clock 120 runs too fast and must be slowed down. If the clock advance 123 is less than the half-cycle duration 235, the internal clock 120 runs too slowly and must be accelerated. Slowing down or speeding up the internal clock 120 may be accomplished for each device 100 of the system 10 e.g. by adjusting the adjustable parameter 112 that specifies the ratio to the frequency 111 of the internal clock generator 110 by which the respective internal clock 120 is incremented.

An alternative possibility of synchronizing the internal clock 120 by the network frequency 230 of the network 200 is to control the speed of the internal clock 120 so that the clock advance 123 between successive zero crossings 220 of the voltage 210 always remains approximately the same. If the clock advance 123 between successive zero crossings 220 of the voltage 210 increases over time, the internal clock 120 runs too fast and must be slowed down. If the clock advance 123 between successive zero crossings 220 of the voltage 210 decreases with time, the internal clock 120 runs too slowly and must be accelerated. Slowing down or speeding up the internal clock 120 may in turn be accomplished for each device 100 of the system 10 e.g. by adjusting the adjustable parameter 112 that specifies the ratio to the frequency 111 of the internal clock generator 110 by which the respective internal clock 120 is incremented. With this option for synchronizing the internal clock 120 with the network frequency 230 of the network 200, the devices 100 do not need to know the network frequency 230 of the network 200.

The described synchronization of the internal clock 120 with the network frequency 230 of the network 200 is conveniently performed periodically. For example, the internal clock 120 may be synchronized with the network frequency 230 of the network 200 at each zero crossing 220 of the voltage 210 of the network 200. However, it is also possible to synchronize the internal clock 120 less frequently than every zero crossing 220 of the voltage 210 of the network 200. For example, the internal clock could be synchronized only at every other zero crossing 220 of the voltage 210 of the network 200.

In addition to the components described above that are present in all devices 100, the devices 100 of the system 10 may comprise other components and features that may alternatively be omitted. Examples of some such features are described below. Each of the devices 100 of the system 10 may optionally have one or a plurality of these or other features.

In the example shown in FIG. 1, the first device 100, 101 comprises a sensor input 140. The first device 100, 101 is configured to detect a measuring value 141 by the sensor input 140. The measuring value 141 may e.g. be an electrical voltage value. The first device 100, 101 may be embodied to provide the measuring value 141 with a time stamp 124 by forming a first data packet 310 schematically shown in FIG. 3 from the measuring value 141 and the time stamp 124. The time stamp 124 indicates the value of the internal clock 120 of the first device 100, 101 at the point in time at which the measuring value 141 was acquired.

In the example shown in FIG. 1, the first device 100, 101 comprises a data connection 160 by which the first device 100, 101 is connected to a data network 300. The data network 300 may e.g. be an Ethernet-based data network. For example, the data network 300 may be an EtherCAT data network. In this case, the first device 100, 101 is configured as an EtherCAT network subscriber.

Figure 3:
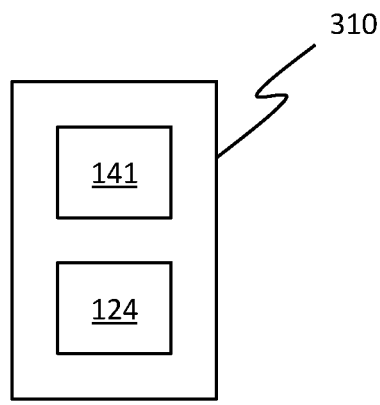
FIG. 3 a first data packet.

The first device 100, 101 may be embodied to send out the first data packet 310 shown in FIG. 3 and having the measuring value 141 and the time stamp 124 associated with the measuring value 141 over the data network 300. In doing so, the first device 100, 101 may e.g. send the first data packet 310 to another device 100 of the system 10. Since this further device 100 also synchronizes its internal clock 120 with the network frequency 230 of the network 200, the time stamp 124 contained in the first data packet 310 then refers to a time system that is synchronized with the internal clock 120 of the further device 100.

Figure 4:
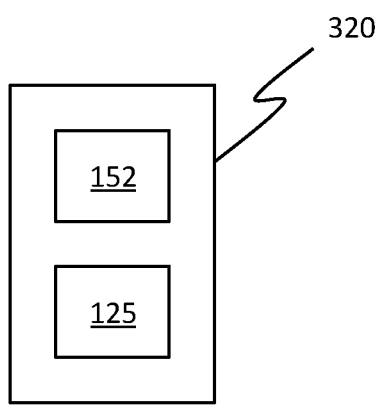
FIG. 4 a second data packet.

In the example shown in FIG. 1, the first device 100, 101 comprises a signal output 150. The first device 100, 101 is embodied to output a signal 151 via the signal output 150. For example, the first device 100, 101 may be configured to output the signal 151 with a predetermined signal value 152 at a predetermined time value 125 of the internal clock 120 of the first device 100, 101. The time value 125 and the signal value 152 may e.g. be received by the first device 100, 101 in a second data packet 320 schematically shown in FIG. 4 via the data network 300. The first device 100, 101 may e.g. receive the second data packet 320 from a further device 100 of the system 10. Since the internal clock 120 of this further device 100 is also synchronized with the network frequency 230 of the network 200, the further device 100 may determine the time value 125 on the basis of its internal clock 120 which is synchronous to the internal clock 120 of the first device 100, 101.

The devices 100 of the system 10 may e.g. be Internet of Things (IoT) devices. For example, the devices 100 of the system 10 may be distributed control and measurement devices of an industrial plant, wind farm, solar farm, or other facility. For example, the first device 100, 101 of the system 10 may be arranged on a blade of a wind power plant, while the second device 100, 102 is arranged on a hub of the wind power plant.

The invention claimed is:

1. A method for operating a device, which comprises an internal clock generator and an internal clock and is connected to a network,
   wherein the internal clock is incremented by the internal clock generator, and
   wherein the internal clock is synchronized with a network frequency of the network;
   wherein the method comprises the following steps:
   detecting a measuring value; and
   providing the measuring value with a time stamp of the internal clock.

2. The method according to claim 1, wherein the internal clock is periodically synchronized with the network frequency of the network.

3. The method according to claim 2,
   wherein the network is a power-supply network,
   wherein zero crossings of a voltage of the network are detected, and
   wherein the internal clock is synchronized with the network frequency of the network for each occurring zero crossing of the voltage.

4. The method according to claim 1, wherein the internal clock generator has a frequency which is higher than the network frequency of the network.

5. The method according to claim 1, wherein the method comprises the following further step:
   sending out the measuring value provided with the time stamp via a data network.

6. The method according to claim 1, wherein the method comprises the following step:
   outputting a signal at a predefined time value of the internal clock.

7. A device comprising:
   an internal clock which is configured to be incremented by an internal clock generator, and
   further comprising a network connection for connecting to a network,
   wherein the device is embodied to synchronize the internal clock with a network frequency of the network; and
   wherein the device is embodied to detect a measuring value and to provide the detected measuring value with a time stamp of the internal clock.

8. The device according to claim 7,
   wherein the network connection is configured to be connected to a power-supply network, and
   wherein the device is embodied to detect zero crossings of a voltage of the network.

9. The device according to claim 7, wherein the internal clock generator has a frequency which is higher than the network frequency of the network.

10. The device according to claim 7, wherein the device is embodied to send out the measuring value provided with the time stamp via a data network.

11. The device according to claim 7, wherein the device is embodied to output a signal at a predefined time value of the internal clock.

12. The device according to claim 7, wherein the device is embodied as an EtherCAT-network subscriber.

13. A system comprising a first device and a second device, each of which is configured according to claim 7, wherein the first device and the second device are connected to a shared network.

* * * * *